J. J. Squire.
Gas and Water Meter.
Nº 37,832.   Patented Mar. 3, 1863.
Fig. 2.
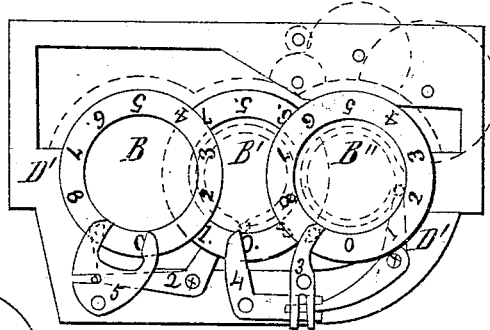
Fig. 4.
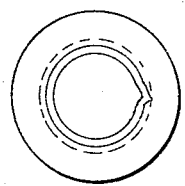
Fig. 5.
Fig. 3.
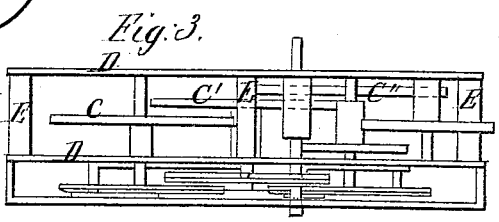
Fig. 1.
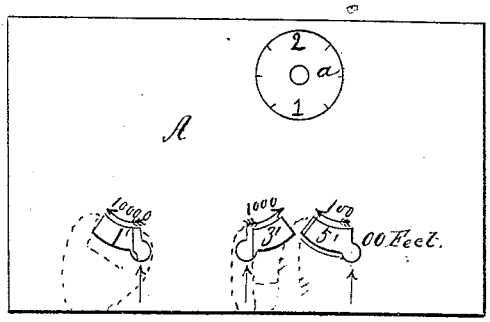
Witnesses;
F. D. Sloat
A. W. Husted
Inventor;
John J. Squire

UNITED STATES PATENT OFFICE.

JOHN J. SQUIRE, OF NEW HAVEN, CONNECTICUT.

IMPROVED REGISTER FOR GAS AND WATER METERS.

Specification forming part of Letters Patent No. 37,832, dated March 3, 1863.

*To all whom it may concern:*

Be it known that I, JOHN J. SQUIRE, of the city of New Haven, in the county of New Haven and State of Connecticut, have invented a certain new and useful Improved Register for Gas and Water Meters; and I do hereby declare that the following is a full, clear, and exact description thereof, reference being had to the accompanying drawings, and to the letters and marks thereon.

My invention has for its object indicating and registering the quantity or amount of gas or other fluid which shall have passed through the meter with perfect accuracy and reliability; and it consists in combining with the toothed wheels, or "movements," as commonly called, of the indicating portion of the meter certain cams and levers, or their equivalents, so being operated that certain figures are shown or exposed, and certain other figures not shown or exposed, whereby confusion is prevented and the registering simplified and perfected.

Of the drawings forming part of this specification, Figure 1 is a front elevation of the registering case or box, Fig. 2 being a front view with the outer plate removed, so as to show the interior means or movements, Fig. 3 being a top view or plan; Figs. 4 and 5, a plan and view by sections of the revolving dial and cam combined.

In each of these figures like parts are indicated by like letters and marks.

The outer plate or cover, A, has openings 1' 3' 5' immediately in front of each dial, which openings are equal to the distance of consecutive figures. The small dial, *a*, having a measurement of five, is used only as evidence of the meter's working.

B B' B'' are revolving disks or dials having the figures from 1 to 10 arranged equidistant around their faces. These dials are firmly secured to the end of spindles, carrying their respective toothed wheels *c c' c''*, which work in train, and are propelled by the movements connected with the passage of the gas or other fluid through the meter. On the back of the dials B' B'' are cam-grooves, as shown by Figs. 4 and 5, or cam flanges or projections. If the grooves be used, a pin on the end of the lever fits into the groove, and if the projections be used, the end of the lever is slitted to fit the flange or projection.

Plates D D, when secured together by braces *e e e*, constitute the frame which contains the working parts. The levers 1 2, Fig. 2, are connected to the frame D' by pins *x x*, which serve as fulcrums. One end of the lever is connected to the cam-flange or fitted into the cam-groove, while the other end is attached to the shields 3 4 5. These shields move upon their pivots freely, and are arranged in front of each respective dial and back of the openings 1' 3' 5' in the cover A, so as to contract these openings at the right or the left hand, as required. Lever 1 is connected to dial B'' and its cam, and to shields 3 and 4, as shown by Fig. 2 of the drawings, and lever 2 is connected to dial B' and to shield 5.

Now, on motion being given to the movements or train of wheels by the passage of gas or other fluid the dials B B' B'' are made to revolve. As the dials are revolved, the levers 1 2 are acted upon the cams and give motion to the shields 3 4 5. Dial B'' revolved once round would indicate a passage or flow of gas equal to a quantity of one thousand, which would be recorded upon dial B', next in value, and dial B', having made one revolution, would indicate a quantity passed equal to ten thousand, which would be recorded upon dial B, and so on as to the number in the train.

As dial B'' revolutions have to be recorded by the dial B', and so on to B, it necessarily follows that the figures will not only be correct, but will be clear and distinct and be read without confusion or mistake. This results from the simultaneous action of the dials, cams, levers, and shields, the latter hiding the receding figure and exposing the advancing figure as the change takes place from a lower to a higher denomination, and hence the reading of the register is rendered simple, easy, and free from confusion or error.

By referring to Fig. 2 of the drawings it will be seen that each dial stands upon the point of change simultaneously, which only occurs on starting anew at a measurement of one hundred thousand. B'' being upon the point of change, lever 1 is acted upon by the cam, and the shields 3 and 4 are moved, 3 to hide the figure 9 and 4 to expose the 0 in dial B', while, at the same time, the 9 on dial B' is hidden by the projection upon the dial B''. B', being also upon the change-lever 2, is also acted upon by its cam, which simultaneously moves shield 5, hiding the figure 9 and exposing the 0 in B. As each revolves their shields are reversed, and the openings in the cover A are left full, so that each recording number is clearly seen during the intervals of each consecutive change and at no other period.

What I claim as my invention, and desire to secure by Letters Patent, is—

The above-described arrangement of the cams, levers, and shields when applied to gas or water meters, as and for the purpose herein set forth.

JOHN J. SQUIRE.

Witnesses:
F. D. SLOAT,
A. W. HUSTED.